(12) United States Patent
Huang et al.

(10) Patent No.: US 10,819,484 B2
(45) Date of Patent: Oct. 27, 2020

(54) SOUNDING REFERENCE SIGNAL CONFIGURATION METHOD AND APPARATUS

(71) Applicant: Huawei Technologies Co., Ltd., Shenzhen (CN)

(72) Inventors: Yi Huang, Shenzhen (CN); Lu Wu, Shenzhen (CN); Yi Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/180,935

(22) Filed: Nov. 5, 2018

(65) Prior Publication Data

US 2019/0109689 A1   Apr. 11, 2019

Related U.S. Application Data

(63) Continuation of application No. PCT/CN2017/082875, filed on May 3, 2017.

(30) Foreign Application Priority Data

May 5, 2016   (CN) .......................... 2016 1 0293651

(51) Int. Cl.
*H04L 5/00* (2006.01)
*H04B 17/318* (2015.01)
(Continued)

(52) U.S. Cl.
CPC ......... *H04L 5/0048* (2013.01); *H04B 17/318* (2015.01); *H04L 5/0051* (2013.01);
(Continued)

(58) Field of Classification Search
CPC ... H04L 5/0048; H04L 5/0053; H04L 5/0051; H04L 5/1469; H04L 5/0094; H04L 5/14;
(Continued)

(56) References Cited

U.S. PATENT DOCUMENTS

2011/0058505 A1   3/2011   Pan et al.
2012/0202558 A1*  8/2012   Hedberg .............. H04L 5/0058
                                                                455/550.1
2017/0273128 A1*  9/2017   Abedini ............. H04J 13/0062

FOREIGN PATENT DOCUMENTS

CN   101447826 A   6/2009
CN   101572896 A   11/2009
(Continued)

OTHER PUBLICATIONS

3GPP TS 36.213, No. V13.0.0, Jan. 5, 2016.*
(Continued)

*Primary Examiner* — Lakeram Jangbahadur
(74) *Attorney, Agent, or Firm* — Leydig, Voit & Mayer, Ltd.

(57) ABSTRACT

Embodiments of the present application disclose a sounding reference signal configuration method and an apparatus. The method includes: determining, by a base station, a movement speed of user equipment UE; determining, by the base station based on the movement speed of the UE, a UE-specific subframe configuration set in a plurality of UE-specific SRS subframe configuration sets corresponding to a used cell-specific SRS subframe configuration set, and determining a UE-specific SRS subframe configuration parameter in the determined UE-specific subframe configuration set, where the UE-specific SRS subframe configuration parameter is used to indicate a subframe used to send an SRS; and sending, by the base station, the UE-specific SRS subframe configuration parameter and identification information of the UE-specific subframe configuration set to the UE.

14 Claims, 5 Drawing Sheets

(51) Int. Cl.
  *H04L 5/14* (2006.01)
  *H04W 64/00* (2009.01)
  *H04W 72/04* (2009.01)

(52) U.S. Cl.
  CPC .......... *H04L 5/0053* (2013.01); *H04L 5/0094* (2013.01); *H04L 5/14* (2013.01); *H04L 5/1469* (2013.01); *H04W 64/006* (2013.01); *H04W 72/0446* (2013.01)

(58) Field of Classification Search
  CPC ............ H04B 17/318; H04W 72/0446; H04W 64/006; H04W 72/1278
  See application file for complete search history.

(56) References Cited

FOREIGN PATENT DOCUMENTS

| | | | |
|---|---|---|---|
| CN | 101714897 | A | 5/2010 |
| CN | 101960736 | A | 1/2011 |
| CN | 103002585 | A | 3/2013 |
| CN | 103179666 | A | 6/2013 |
| WO | 2011057576 | A1 | 5/2011 |
| WO | 2011152685 | A2 | 12/2011 |
| WO | 2014109685 | A1 | 7/2014 |

OTHER PUBLICATIONS

3GPP TS 36.211,No. V13.0.0, Jan. 5, 2016.*
LG Electronics: "Further considerations on UL sounding RS", 3GPP Draft; R1-072876, Jun. 20, 2007.*
Mitsubishi Electric: "SRS enhancements for latency reduction", 3GPP Draft; R1-162581, Apr. 2, 2016.*

"Discussion on UE-specific SRS configuration," 3GPP TSG RAN WG1 Meeting #70,Qingdao, China, R1-123219 3rd Generation Partnership Project, Valbonne, France (Aug. 13-17, 2012).
"SRS enhancements for EB/FD-MIMO," 3GPP TSG RAN WG1 Meeting #83, Anaheim, USA, R1-156589, 3rd Generation Partnership Project, Valbonne, France (Nov. 15-22, 2015).
"CR on SRS capacity enhancement using UpPTS," 3GPP TSG RAN WG1 Meeting #84,St Julian's, Malta, 3rd Generation Partnership Project, Valbonne, France (Feb. 15-19, 2016).
"3rd Generation Partnership Project; Technical Specification Group Radio Access Network; Evolved Universal Terrestrial Radio Access (E-UTRA); Physical channels and modulation(Release 13)," 3GPP TS 36.211 V13.1.0, pp. 1-155, 3rd Generation Partnership Project, Valbonne, France (Mar. 2016).
"3rd Generation Partnership Project;Technical Specification Group Radio Access Network;Evolved Universal Terrestrial Radio Access (E-UTRA);Physical layer procedures(Release 13)," 3GPP TS 36.213 V13.1.1, pp. 1-361, 3rd Generation Partnership Project, Valbonne, France (Mar. 2016).
"SRS enhancements for latency reduction," 3GPP TSG-RAN WG1 #84bis, Busan, Republic of Korea, R1-162581, 3rd Generation Partnership Project, Valbonne, France (Apr. 11-15, 2016).
"Further considerations on UL sounding RS," 3GPP TSG RAN WG1 #49bis, Orlando, US, R1-072876, 3rd Generation Partnership Project, Valbonne, France (Jun. 25-29, 2007).
"3rd Generation Partnership Project; Technical Specification Group Radio Access Network; Evolved Universal Terrestrial Radio Access (E-UTRA); Physical channels and modulation(Release 13)," 3GPP TS 36.211 V13.0.0, pp. 1-141, 3rd Generation Partnership Project, Valbonne, France (Dec. 2015).
"3rd Generation Partnership Project; Technical Specification Group Radio Access Network; Evolved Universal Terrestrial Radio Access (E-UTRA); Physical layer procedures(Release 13)," 3GPP TS 36.213 V13.0.0, pp. 1-326, 3rd Generation Partnership Project, Valbonne, France (Dec. 2015).

* cited by examiner

SOUNDING REFERENCE SIGNAL CONFIGURATION METHOD AND APPARATUS

CROSS-REFERENCE TO RELATED APPLICATIONS

This application is a continuation of International Patent Application No. PCT/CN2017/082875, filed on May 3, 2017, which claims priority to Chinese Patent Application No. 201610293651.3, filed on May 5, 2016. The disclosures of the aforementioned applications are hereby incorporated by reference in their entireties.

TECHNICAL FIELD

Embodiments of the present application relate to the communications field, and in particular, to a sounding reference signal configuration method and an apparatus.

BACKGROUND

As one of key 5G technologies, massive antennas (Massive Multiple Input Multiple Output, Massive MIMO) can further improve system capacities by using higher spatial degrees of freedom. After a base station configures a massive transmit antenna, accuracy of downlink channel information becomes one of important factors restricting performance. In a time division duplex (Time Division Duplexing, TDD) system, a base station can effectively obtain, by using reciprocity of uplink and downlink channels, downlink channel information required by a beamforming technology. Therefore, the TDD system has inherent advantages in using the massive MIMO technology.

If using a conventional digital beamforming technology, a base station needs to configure a radio frequency chain for each transmit antenna. In a TDD massive MIMO system, this increases costs of a base station and baseband processing complexity. Hybrid beamforming (Hybrid Beamforming, HBF) is an effective method that can reduce processing complexity and costs. The HBF technology is a two-level beamforming technology (as shown in FIG. 1). In one aspect, a base station implements first-level dynamic analog beamforming by using a phase shifter to change an antenna downtilt, and baseband processing complexity can be reduced by using spatial dimension reduction. In another aspect, a base station implements a second-level digital beamforming by using baseband processing, to schedule multiple users and suppress interference between users. In a second-level digital beamforming technology, effective channel information needs to be obtained. In the TDD system, a base station can relatively accurately estimate effective channel information based on a received channel sounding reference signal (Sounding Reference Signal, SRS). In addition, to implement the first-level dynamic analog beamforming, the base station further needs to obtain complete channel information (for example, a long-term statistical property of complete channel information and a complete channel matrix). However, an existing SRS configuration solution is mainly designed to obtain effective channel information, and cannot desirably support a base station to obtain complete channel information.

SUMMARY

Embodiments of the present application provide an SRS configuration method and an apparatus, to help a base station obtain complete channel information.

According to a first aspect, an SRS configuration method is provided. The method includes: determining, by a base station, a movement speed of user equipment UE; determining, by the base station based on the movement speed of the UE, a UE-specific subframe configuration set allocated to the UE in a plurality of UE-specific SRS subframe configuration sets, and determining a UE-specific SRS subframe configuration parameter in the UE-specific subframe configuration set allocated to the UE, where the SRS subframe configuration parameter is used to indicate a subframe used to send an SRS; and sending, by the base station, the UE-specific SRS subframe configuration parameter and identification information of the UE-specific subframe configuration set to the UE.

The UE-specific SRS subframe configuration set allocated to the UE is determined in a plurality of UE-specific SRS subframe configuration sets based on the movement speed of the UE, and the UE-specific SRS subframe configuration parameter is determined in the UE-specific SRS subframe configuration set, so that a density of sending an SRS by the UE can be adaptively adjusted based on the movement speed of the UE, to help the base station obtain complete channel information. In addition, SRS resource waste can be avoided.

The UE-specific SRS subframe configuration parameter may be mapped to an SRS configuration period and an SRS subframe offset in the UE-specific SRS subframe configuration set. For example, the SRS subframe configuration parameter is an SRS subframe configuration index in the UE-specific SRS subframe configuration set.

The UE-specific SRS subframe configuration set may be stored in a form of a table. In this case, the UE-specific SRS subframe configuration set may also be referred to as a UE-specific SRS subframe configuration table.

Optionally, the plurality of UE-specific SRS subframe configuration sets may correspond to different movement speeds.

With reference to the first aspect, in a first possible implementation of the first aspect, the method further includes: sending, by the base station, a quantity $L_1$ to the UE, where $L_1$ is a maximum quantity of symbols that are in a subframe and that are used to send an SRS. This can prevent the UE from transmitting a PUSCH on a symbol that may be used by another UE to send an SRS.

Optionally, $L_1$ symbols that are in a subframe and that are used to send an SRS are concentrated on the last $L_1$ symbols in the subframe.

Optionally, the quantity $L_1$ is determined based on a ratio of a physical antenna quantity to an antenna port quantity of the base station.

With reference to the first aspect or the first possible implementation of the first aspect, in a second possible implementation of the first aspect, the method further includes: sending, by the base station, indication information to the UE, where the indication information is used to indicate a manner used by the UE to send $L_2$ SRSs after an aperiodic SRS is triggered, or is used to indicate a manner used by the UE to send $L_2$ SRSs in each period, and $L_2$ is a positive integer greater than 1 and less than or equal to $L_1$.

Optionally, a manner used to send the $L_2$ SRSs may be determined by the base station based on the movement speed of the UE.

The base station may preconfigure a plurality of SRS sending manners corresponding to movement speeds of UEs, to satisfy a requirement for an SRS when the base station obtains complete channel information in different movement scenarios.

Optionally, the indication information is further used to instruct the UE to send the $L_2$ SRSs after triggering the aperiodic SRS, or is used to instruct the UE to send the $L_2$ SRSs in each period.

In other words, the base station may notify, by using the indication information, the UE of a quantity of SRSs sent after the aperiodic SRS is triggered, or a quantity of SRSs sent in each period.

Optionally, the base station and the UE may further agree on in advance that the quantity of SRSs sent after the aperiodic SRS is triggered or in each period is the same as the maximum quantity $L_1$ of symbols that are in a subframe and that are used to send an SRS. In this case, the base station does not need to send the indication information to the UE to notify the UE of the quantity of SRSs sent after the aperiodic SRS is triggered, or the quantity of SRSs sent in each period.

With reference to the second possible implementation of the first aspect, in a third possible implementation of the first aspect, the manner includes: sending the $L_2$ SRSs in one subframe indicated by the UE-specific SRS subframe configuration parameter.

Optionally, symbols used to send the $L_2$ SRSs are concentrated on the last L2 symbols in the subframe.

With reference to the second possible implementation of the first aspect, in a fourth possible implementation of the first aspect, the manner includes: sending the $L_2$ SRSs in a plurality of subframes starting from a subframe indicated by the UE-specific SRS subframe configuration parameter.

With reference to the fourth possible implementation of the first aspect, in a fifth possible implementation of the first aspect, the sending the $L_2$ SRSs in a plurality of subframes starting from a subframe indicated by the UE-specific SRS subframe configuration parameter includes: transmitting Y SRSs in an $n^{th}$ subframe counted from the subframe indicated by the SRS subframe configuration parameter, until the $L_2$ SRSs are sent, where $$Y = \min\left(L_2 - \sum_{m=1}^{n-1} X_m, X_n\right);$$

$X_n =$ $$\begin{cases} 1, n \text{ is a special subframe and a length of an } UpPTS \text{ is one symbol} \\ 2, n \text{ is a special subframe and a length of an } UpPTS \text{ is two symbols} \\ \left\lceil \frac{L_2}{N} \right\rceil, n \text{ is a normal subframe} \end{cases};$$

and

N is a positive integer greater than or equal to 2 and less than or equal to $L_2$.

Optionally, symbols used to send the Y SRSs are concentrated on the last Y symbols in the $n^{th}$ subframe.

With reference to the first aspect or any one of the foregoing possible implementations of the first aspect, in a sixth possible implementation of the first aspect, the method further includes: determining, by the base station, movement speeds of all UEs in a cell; determining, by the base station, the used cell-specific SRS subframe configuration set in a plurality of cell-specific SRS subframe configuration sets based on the movement speeds of all the UEs in the cell, and determining a cell-specific SRS subframe configuration parameter in the determined cell-specific SRS subframe configuration set, where the cell-specific SRS subframe configuration set corresponds to the plurality of UE-specific SRS subframe configuration sets, and the cell-specific SRS subframe configuration parameter is used to indicate a subframe set used to send an SRS in the cell; and sending, by the base station, the cell-specific SRS subframe configuration parameter and identification information of the cell-specific SRS subframe configuration set to the UE.

Each cell-specific SRS subframe configuration set includes a plurality of cell-specific SRS subframe configuration parameters. The cell-specific SRS subframe configuration set may also be stored in a form of a table. In this case, the cell-specific SRS subframe configuration set may also be referred to as a cell-specific SRS subframe configuration table.

The used cell-specific SRS subframe configuration set is determined in the plurality of cell-specific SRS subframe configuration sets based on the movement speeds of all the UEs in the cell, and the cell-specific subframe configuration parameter is determined in the cell-specific SRS subframe configuration set. In this way, an SRS resource of the cell can be adaptively adjusted based on the movement speeds of all the UEs in the cell, to not only satisfy a requirement for an SRS resource required when the base station obtains complete channel information, but also avoid SRS resource waste of the cell.

In addition, after receiving the cell-specific SRS subframe configuration parameter, the UE may determine subframe sets in which UE may send an SRS, to avoid a conflict between transmission of an SRS and transmission of a physical uplink shared channel PUSCH by different UEs in the cell.

Optionally, the base station may determine the used cell-specific SRS subframe configuration set in the plurality of cell-specific SRS subframe configuration sets based on an average movement speed of all the UEs in the cell.

The cell-specific SRS subframe configuration parameter may be mapped to an SRS configuration period and an SRS subframe offset set in the cell-specific SRS subframe configuration set. For example, the cell-specific SRS subframe configuration parameter is an SRS subframe configuration index in the cell-specific SRS subframe configuration set.

Optionally, the plurality of cell-specific SRS subframe configuration sets may correspond to different speed intervals.

The plurality of cell-specific SRS subframe configuration sets are configured, so that the base station performs the operation of determining the used cell-specific SRS subframe configuration set based on the movement speeds of all the UEs in the cell more conveniently.

Optionally, the base station may further determine the used cell-specific subframe configuration set in the plurality of cell-specific SRS subframe configuration sets based on the movement speeds of all the UEs in the cell and a quantity of UEs in the cell.

Because the quantity of UEs in the cell affects an SRS resource requirement, determining the cell-specific SRS subframe configuration set based on the movement speeds of all the UEs in the cell and the quantity of UEs in the cell can further satisfy an SRS resource requirement of the cell and avoid SRS resource waste.

It should be understood that the base station and the UE may alternatively configure only one cell-specific SRS subframe configuration set. In this case, the base station needs to determine the used cell-specific SRS subframe configuration parameter in the cell-specific SRS subframe configuration set only based on the movement speeds of all the UEs in the cell and the quantity of UEs.

According to a second aspect, an SRS configuration method is provided. The method includes: receiving, by user equipment UE, identifiers of a UE-specific SRS subframe configuration parameter and a UE-specific subframe configuration set to which the UE-specific SRS subframe configuration parameter belongs, where the identifiers are sent by a base station, and the UE-specific subframe configuration set is determined by the base station based on a movement speed of the UE in a plurality of UE-specific subframe configuration sets; and determining, by the UE based on the identifiers of the UE-specific SRS subframe configuration parameter and the UE-specific subframe configuration set, a subframe used to send an SRS.

The UE may alternatively preconfigure the plurality of UE-specific subframe configuration sets, and may determine, based on the identifier of the UE-specific subframe configuration set sent by the base station, the UE-specific subframe configuration set allocated by the base station to the UE.

It should be understood that the method corresponds to the method according to the first aspect, and corresponding content is properly omitted herein.

The identifier of the UE-specific SRS subframe configuration set determined by the base station based on the movement speed of the UE and the UE-specific SRS subframe configuration parameter are received, and the subframe used to send an SRS is determined based on the two, so that the sent SRS can satisfy an SRS requirement when the base station obtains complete channel information.

With reference to the second aspect, in a first possible implementation of the second aspect, the method further includes: receiving, by the UE, a quantity $L_1$ sent by the base station, where $L_1$ is a maximum quantity of symbols that are in a subframe and that are used to send an SRS, and $L_1$ is a positive integer greater than 1.

Optionally, $L_1$ symbols that are in a subframe and that are used to send an SRS are concentrated on the last $L_1$ symbols in the subframe.

Optionally, the quantity $L_1$ is determined based on a ratio of a physical antenna quantity to an antenna port quantity of the base station.

With reference to the second aspect or the first possible implementation of the second aspect, in a second possible implementation of the second aspect, the method further includes: receiving, by the UE, indication information sent by the base station, where the indication information is used to indicate a manner used by the UE to send $L_2$ SRSs after an aperiodic SRS is triggered, or is used to indicate a manner used by the UE to send $L_2$ SRSs in each period, L2 is a positive integer greater than 1 and less than or equal to $L_1$, and $L_1$ is a maximum quantity of symbols that are in a subframe and that are used to send an SRS.

Optionally, a manner used to send the $L_2$ SRSs may be determined by the base station based on the movement speed of the UE.

Optionally, the indication information is further used to instruct the UE to send the $L_2$ SRSs after triggering the aperiodic SRS, or is used to instruct the UE to send the $L_2$ SRSs in each period.

With reference to the second possible implementation of the second aspect, in a third possible implementation of the second aspect, the manner includes: continuously sending the $L_2$ SRSs in one subframe indicated by the SRS subframe configuration parameter.

With reference to the second possible implementation of the second aspect, in a fourth possible implementation of the second aspect, the manner includes: sending the $L_2$ SRSs in a plurality of subframes starting from a subframe indicated by the SRS subframe configuration parameter.

With reference to the fourth possible implementation of the second aspect, in a fifth possible implementation of the second aspect, the sending the $L_2$ SRSs in a plurality of subframes starting from a subframe indicated by the SRS subframe configuration parameter includes: transmitting Y SRSs in an $n^{th}$ subframe counted from the subframe indicated by the SRS subframe configuration parameter, until the $L_2$ SRSs are sent, where $$Y = \min\left(L_2 - \sum_{m=1}^{n-1} X_m, X_n\right);$$

$$X_n = \begin{cases} 1, & n \text{ is a special subframe and a length of an } UpPTS \text{ is one symbol} \\ 2, & n \text{ is a special subframe and a length of an } UpPTS \text{ is two symbols} \\ \left\lceil \frac{L_2}{N} \right\rceil, & n \text{ is a normal subframe} \end{cases};$$

and

N is a positive integer greater than or equal to 2 and less than or equal to $L_2$.

With reference to the second aspect or any one of the foregoing possible implementations of the second aspect, in a sixth possible implementation of the second aspect, the method further includes: receiving, by the UE, identifiers of a cell-specific SRS subframe configuration parameter and the cell-specific SRS subframe configuration set to which the cell-specific SRS subframe configuration parameter belongs, where the identifiers are sent by the base station, and the cell-specific SRS subframe configuration set is determined by the base station in a plurality of cell-specific SRS subframe configuration sets based on movement speeds of all UEs in a cell; and determining, by the UE based on the cell-specific SRS subframe configuration parameter and the identification information of the cell-specific SRS subframe configuration set, a subframe set used to send an SRS in the cell.

The identifier of the used cell-specific SRS subframe configuration set determined by the base station based on the movement speeds of all the UEs in the cell and the cell-specific SRS subframe configuration parameter are received, and the subframe set used to send an SRS in the cell is determined based on the two. Therefore, subframe sets in which UE may send an SRS can be determined, to avoid transmitting a physical uplink shared channel PUSCH in a subframe that may be used by another UE in the cell to send an SRS.

According to a third aspect, a base station is provided, configured to perform the method according to the first aspect or any possible implementation of the first aspect.

Specifically, the base station may include units configured to perform the method according to the first aspect or any possible implementation of the first aspect.

According to a fourth aspect, user equipment is provided, configured to perform the method according to the second aspect or any possible implementation of the second aspect.

Specifically, the user equipment may include units configured to perform the method according to the second aspect or any possible implementation of the second aspect.

According to a fifth aspect, a base station is provided, including a processor, a transmitter, a memory, and a bus system. The processor, the transmitter, and the memory are connected by using the bus system. The memory is configured to store an instruction. The processor is configured to execute the instruction stored by the memory, and execution of the instruction stored by the memory causes the base station to perform the method according to the first aspect or any possible implementation of the first aspect.

According to a sixth aspect, user equipment is provided, including a processor, a receiver, a memory, and a bus system. The processor, the receiver, and the memory are connected by using the bus system. The memory is configured to store an instruction. The processor is configured to execute the instruction stored by the memory, and execution of the instruction stored by the memory causes the user equipment to perform the method according to the second aspect or any possible implementation of the second aspect.

According to a seventh aspect, a computer-readable storage medium is provided. The computer-readable storage medium stores one or more programs, and the one or more programs include an instruction. When the instruction is executed by a base station, the base station is caused to perform the method according to the first aspect or any possible implementation of the first aspect.

According to an eighth aspect, a computer-readable storage medium is provided. The computer-readable storage medium stores one or more programs, and the one or more programs include an instruction. When the instruction is executed by user equipment, the user equipment is caused to perform the method according to the second aspect or any possible implementation of the second aspect.

DESCRIPTION OF EMBODIMENTS

Figure 1:
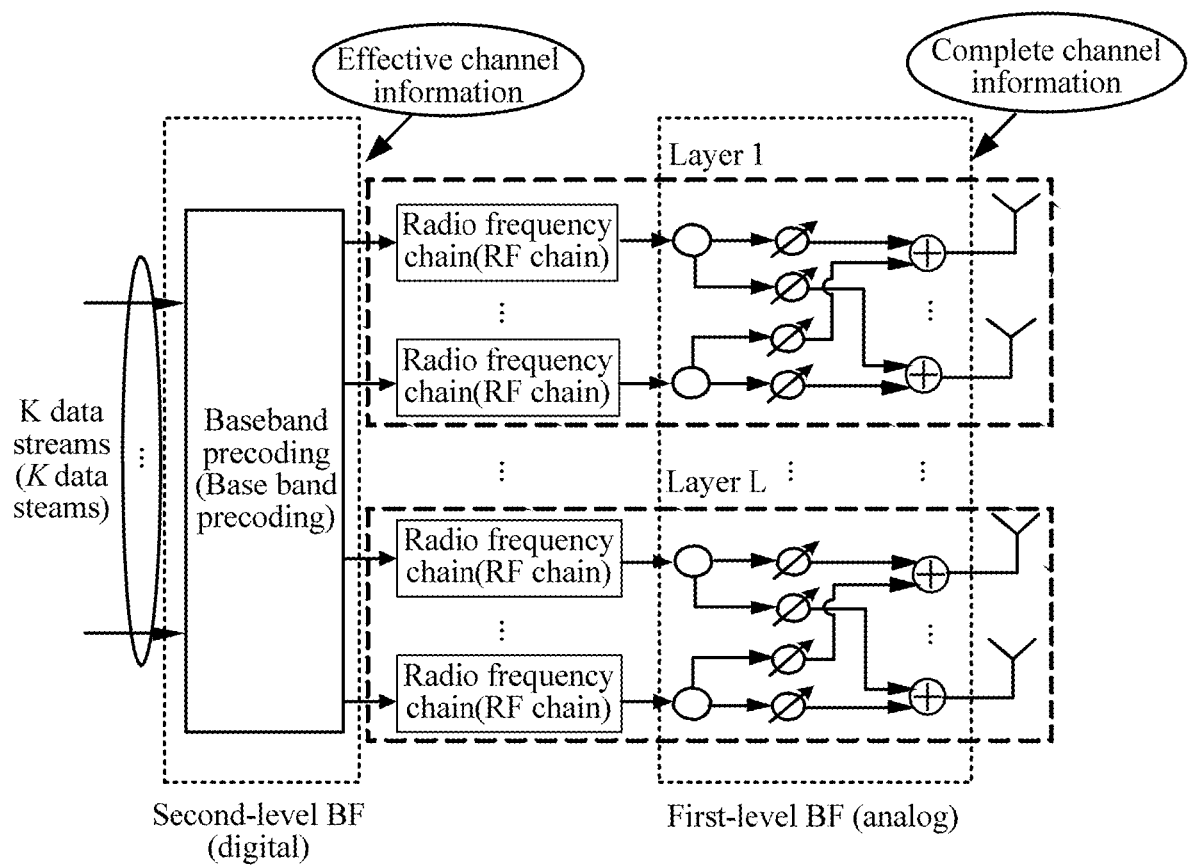
FIG. 1 is a schematic block diagram of a hybrid beamforming solution.

The following describes the technical solutions in the embodiments of the present application with reference to the accompanying drawings in the embodiments of the present application.

The technical solutions of the present application may be applied to various wireless communications systems, for example, Wideband Code Division Multiple Access (Wideband Code Division Multiple Access Wireless, WCDMA), high-speed packet access (High-Speed Packet Access, HSPA), a Long Term Evolution (Long Term Evolution, LTE) network, a future network, for example, a 5G system, and another communications system connecting terminals in a wireless manner.

A base station in the embodiments of the present application is an access entity in a wireless communications system, and may be a base transceiver station (Base Transceiver Station, BTS) in GSM or CDMA, or may be a NodeB (NodeB) in WCDMA, or may be an evolved Node B (evolved Node B, eNB or e-NodeB) in LTE or a base station in a future 5G network. This is not limited in the embodiments of the present application.

It should further be understood that in the embodiments of this application, user equipment (User Equipment, UE) may include but is not limited to a mobile station (Mobile Station, MS), a mobile terminal (Mobile Terminal), a mobile telephone (Mobile Telephone), a handset (handset), a portable equipment (portable equipment), and the like. The user equipment may communicate with one or more core networks by using a radio access network (Radio Access Network, RAN), for example, a computer and the like. The user equipment may further be a portable, pocket-sized, handheld, computer built-in, or in-vehicle mobile apparatus.

SRSs are classified into periodic SRSs and aperiodic SRSs. Once periodic SRSs are enabled, UE periodically sends SRSs to a base station continuously based on a UE-specific subframe configuration parameter, until the SRSs are disabled. The base station triggers an aperiodic SRS by using downlink control information (Downlink control information, DCI), where the DCI includes SRS configuration information. After receiving the DCI, the terminal sends, based on a subframe configuration parameter, an SRS only in a first subframe satisfying a condition.

An SRS subframe configuration includes a cell-specific (cell specific) SRS subframe configuration and a UE-specific (UE specific) SRS subframe configuration. The UE-specific SRS subframe configuration is used to configure an SRS resource of each UE, the cell-specific SRS subframe configuration is an SRS resource configuration shared by all users in a cell, and the UE-specific SRS subframe configuration is a UE SRS resource configuration. In other words, the cell-specific SRS subframe configuration may be understood as an SRS resource pool, and a base station may allocate an SRS resource to UE in a cell from the SRS resource pool.

A wireless uplink signal uses a subframe as a unit, and duration of each subframe is 1 millisecond (ms). In an uplink direction, each subframe is divided into 14 single carrier frequency division multiple access (Single Carrier Frequency Division Multiple Access, SC-FDMA) symbols. For brevity, the symbol is directly used in this specification for description. If an SRS is sent in a subframe, the SRS occupies the last symbol of the subframe. If the last symbol of the subframe is allocated to the SRS, the symbol cannot be used to transmit other uplink data and uplink signals.

It should be understood that a subframe used to send an SRS described in the embodiments of the present application is an uplink subframe or a special subframe. Table 1 shows an uplink-downlink subframe configuration in a TDD system.

TABLE 1

| Uplink-downlink subframe configuration table | | | | | | | | | | | |
| --- | --- | --- | --- | --- | --- | --- | --- | --- | --- | --- | --- |
| Uplink-downlink configuration | Uplink-downlink subframe switching period | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

Uplink-downlink subframe configuration table

| Uplink-downlink configuration | Uplink-downlink subframe switching period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

D indicates a downlink subframe, U indicates an uplink subframe, and S indicates a special subframe (which may be used as an uplink subframe). The special subframe includes three special timeslots, that is, a downlink pilot time slot (Downlink Pilot Time Slot, DwPTS), a guard period (Guard Period, GP), and an uplink pilot timeslot (Uplink Pilot Time Slot, UpPTS). The DwPTS is used to send a downlink signal, the GP is a guard period for uplink-downlink switching, the UpPTS is used to send an uplink signal, and a length of the UpPTS may be configured as 1 to 2 symbols.

For ease of description, in the embodiments of the present application, a cell-specific SRS subframe configuration table is used as an example to describe a cell-specific SRS subframe configuration set, and a UE-specific SRS subframe configuration table is used as an example to describe a UE-specific SRS subframe configuration set.

Table 2 shows a cell-specific SRS subframe configuration table in a TDD system stipulated in an existing protocol, and Table 2 lists a plurality of configurations. The existing protocol stipulates that a value of a field srs-SubframeConfig delivered by a base station to UE is used to indicate a cell-specific SRS subframe configuration parameter. In each SRS subframe configuration period, a transmission offset $\Delta_{SFC}$ stipulates a subframe number set that can be used to send an SRS. Only the last symbol in a subframe specified by the field srs-SubframeConfig may be used to send an SRS. A subframe configuration 1 is used as an example. An SRS configuration period is 5 ms, and a transmission offset is {1, 2}. In a period of 5 ms from a subframe 0 to a subframe 4, cell-specific SRS resources are distributed in the subframe 1 and the subframe 2. In a period of 10 ms from the subframe 0 to a subframe 9, cell-specific SRS resources are distributed in the subframe 1, the subframe 2, the subframe 6, and the subframe 7.

TABLE 2

Cell-level SRS subframe configuration table

| SRS subframe configuration srs-SubframeConfig | Configuration period $T_{SFC}$ (subframes) Configuration period (subframes) | Transmission offset $\Delta_{SFC}$ (subframes) Transmission offset (subframes) |
|---|---|---|
| 0  | 5  | {1} |
| 1  | 5  | {1, 2} |
| 2  | 5  | {1, 3} |
| 3  | 5  | {1, 4} |
| 4  | 5  | {1, 2, 3} |
| 5  | 5  | {1, 2, 4} |
| 6  | 5  | {1, 3, 4} |
| 7  | 5  | {1, 2, 3, 4} |
| 8  | 10 | {1, 2, 6} |
| 9  | 10 | {1, 3, 6} |
| 10 | 10 | {1, 6, 7} |
| 11 | 10 | {1, 2, 6, 8} |
| 12 | 10 | {1, 3, 6, 9} |
| 13 | 10 | {1, 4, 6, 7} |
| 14 | reserved (reserved) | reserved (reserved) |
| 15 | reserved (reserved) | reserved (reserved) |

Table 3 shows a UE-specific periodic SRS subframe configuration table in a TDD system stipulated in an existing protocol, and Table 4 shows a UE-specific aperiodic SRS subframe configuration table in a TDD system stipulated in an existing protocol. The existing protocol stipulates that a field srs-ConfigIndex in an information element (Information Element, IE) SoundingRS-UL-ConfigDedicated delivered by a base station to UE is used to indicate a UE-specific periodic SRS configuration parameter, and a field srs-ConfigIndexAp-r10 in an information element SoundingRS-UL-ConfigDedicatedAperiodic-r10 is used to indicate a UE-specific aperiodic SRS subframe configuration parameter.

In a TDD system, for a cell whose SRS periodicity $T_{SRS}>2$, a subframe for sending a periodic SRS satisfies:

$$(10 \cdot n_f + k_{SRS} - T_{offset}) \bmod T_{SRS} = 0 \quad (1).$$

For transmission of an SRS whose SRS periodicity $T_{SRS}=2$, a subframe for sending the SRS satisfies:

$$(k_{SRS} - T_{offset}) \bmod 5 = 0 \quad (2).$$

$n_f$ is a system frame number, and for definition of $k_{SRS}$, refer to Table 5.

TABLE 3

Periodic SRS subframe configuration table

| SRS configuration index $I_{SRS,1}$ (SRS Configuration Index) | SRS periodicity $T_{SRS}$ (ms) (SRS Periodicity) | SRS subframe offset $T_{offset}$ (SRS Subframe Offset) |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS,1}$-10 |
| 15-24 | 10 | $I_{SRS,1}$-15 |
| 25-44 | 20 | $I_{SRS,1}$-25 |
| 45-84 | 40 | $I_{SRS,1}$-45 |
| 85-164 | 80 | $I_{SRS,1}$-85 |
| 165-324 | 160 | $I_{SRS,1}$-165 |
| 325-644 | 320 | $I_{SRS,1}$-325 |
| 645-1023 | reserved (reserved) | reserved (reserved) |

TABLE 4

Aperiodic SRS subframe configuration table

| SRS configuration index $I_{SRS,1}$ (SRS Configuration Index) | SRS periodicity $T_{SRS}$ (ms) (SRS Periodicity) | SRS subframe offset $T_{offset}$ (SRS Subframe Offset) |
|---|---|---|
| 0 | reserved (reserved) | reserved (reserved) |
| 1 | 2 | 0, 2 |

TABLE 4-continued

Aperiodic SRS subframe configuration table

| SRS configuration index $I_{SRS,1}$ (SRS Configuration Index) | SRS periodicity $T_{SRS}$ (ms) (SRS Periodicity) | SRS subframe offset $T_{offset}$ (SRS Subframe Offset) |
|---|---|---|
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved (reserved) | reserved (reserved) |

TABLE 5

$K_{SRS}$ in a TDD system

| | Subframe index (subframe index) n | | | | | | | | | |
|---|---|---|---|---|---|---|---|---|---|---|
| | | 1 | | | | | 6 | | | |
| | 0 | First symbol of an UpPTS | Second symbol of an UpPTS | 2 | 3 | 4 | 5 | First symbol of an UpPTS | Second symbol of an UpPTS | 7 | 8 | 9 |
| $k_{SRS}$ when a length of an UpPTS is two symbols | 0 | 1 | | 2 | 3 | 4 | | 5 | 6 | 7 | 8 | 9 |
| $k_{SRS}$ when a length of an UpPTS is one symbol | | 1 | | 2 | 3 | 4 | | 6 | | 7 | 8 | 9 |

In a conventional two-level beamforming solution, a first-level beamforming is designed based on a fixed antenna downtilt that cannot be adjusted. In this case, the base station can obtain effective channel information by configuring static beamforming on an SRS and performing channel estimation. However, an existing SRS solution is mainly designed to obtain effective channel information, and cannot desirably satisfy a requirement of performing HBF dynamic analog precoding to obtain a long-term statistical property of complete channel information.

Assuming that a long-term statistical property of complete channel information of UE does not change within a particular time, UE can continuously send a plurality of groups of broadband SRSs within a channel coherence time, and a base station can obtain a plurality of groups of effective broadband channel information by configuring different analog beamforming on different SRSs and performing channel estimation. Based on this, the base station can estimate instantaneously complete broadband channel information, and calculate a long-term statistical property of complete channel information. Therefore, in the embodiments of the present application, the UE can continuously send a plurality of groups of SRSs within a channel coherence time, to help the base station obtain complete channel information.

Because UEs having different movement speeds have different channel coherence times, for UEs having different movement speeds, the base station also requires different SRS densities to obtain complete channel information. For example, when a movement speed of UE is relatively low, a long-term statistical property of a complete channel changes relatively slowly, and the base station requires a relatively low SRS density to obtain complete channel information. In this case, if a density of sending an SRS by UE is relatively high, time domain resource waste is caused. When a movement speed of UE is relatively high, a long-term statistical property of a complete channel changes relatively quickly, and the base station requires a relatively high SRS density to obtain complete channel information. In this case, if a density of sending an SRS by UE is relatively low, it is unhelpful for the base station to obtain complete channel information.

In this embodiment of the present application, in consideration that a movement speed of UE affects an SRS resource requirement, to satisfy different SRS resource requirements of UEs having different movement speeds, the base station and the UEs may preconfigure a plurality of UE-specific subframe configuration tables.

Optionally, for a cell, an overall movement speed of all UEs in the cell also affects a size of a cell SRS resource pool. To satisfy different SRS resource requirements of movement scenarios of different UEs in the cell, a plurality of cell-specific SRS subframe configuration tables may be preconfigured in a system.

In addition, a quantity of UEs in a cell also affects an SRS resource requirement. A plurality of cell-specific SRS subframe configuration tables are preconfigured, so that when a quantity of UEs in a cell changes, a cell SRS resource configuration can be flexibly adjusted to avoid SRS resource waste. For example, when a quantity of UEs in a cell increases, an SRS density of a cell-specific configuration is increased to improve channel estimation accuracy, and when a quantity of UEs in a cell decreases, an SRS density of a cell-specific configuration is decreased to avoid SRS resource waste.

In the embodiments of the present application, the plurality of cell-specific SRS subframe configuration tables may include a cell-specific SRS subframe configuration table stipulated in an existing protocol shown in Table 2 and another preconfigured cell-specific SRS subframe configuration table shown in Table 6. It should be noted that the embodiments of the present application are not limited to the example of the another cell-specific SRS subframe configuration table shown in Table 6.

TABLE 6

Cell-level SRS subframe configuration table

| SRS subframe configuration srs-SubframeConfig-BF | Configuration period $T_{SFC}$(ms) (Configuration Period) | Transmission offset $\Delta_{SFC}$ (Transmission offset) |
|---|---|---|
| 0 | None | None |
| 1 | 10 | {1,2,3,4,6,7,8,9} |
| 2 | 20 | 10 × (srs-SubframeConfig-BF-4) + {1,2,3,4,6,7,8,9} |
| 3 | 40 | 10 × (srs-SubframeConfig-BF-10) + {1,2,3,4,6,7,8,9} |
| 4 | 80 | 10 × (srs-SubframeConfig-BF-22) + {1,2,3,4,6,7,8,9} |
| 5 | 160 | 10 × (srs-SubframeConfig-BF-46) + {1,2,3,4,6,7,8,9} |
| 6 | reserved (reserved) | reserved (reserved) |

In this embodiment of the present application, a new cell-specific SRS subframe configuration parameter field (for example, a field srs-SubframeConfig-BF) may be predefined to indicate an SRS subframe configuration parameter in the another cell-specific SRS subframe configuration table.

Optionally, the plurality of cell-specific SRS subframe configuration tables may separately correspond to scenarios of different SRS density requirements.

It should be noted that each cell-specific SRS subframe configuration table may include a plurality of cell-specific SRS subframe configuration parameters. In this way, a proper cell-specific SRS subframe configuration parameter may be selected with reference to an average speed of all UEs in a cell and a quantity of UEs in the cell.

Optionally, in this embodiment of the present application, $L_1$ SRSs may be further sent on $L_1$ symbols in an uplink subframe used to send an SRS, where $L_1$ is a positive integer greater than 1. This not only increases resources used to send an SRS, but also can further expand an adjustment range of a density of sending an SRS.

Further, the $L_1$ SRSs may alternatively be continuously sent on $L_1$ continuous symbols in an uplink subframe.

A plurality of SRSs are continuously sent in one subframe. This manner can further increase densities of SRSs sent by the UE, and can help satisfy an SRS requirement of the base station when the base station obtains complete channel information in a high-speed movement scenario of the UE.

The base station may determine the quantity $L_1$ of symbols in an uplink subframe that are used to send an SRS, and then send the quantity $L_1$ to the UE.

For example, the base station may preconfigure a set, and the base station may select $L_1$ from the set and send $L_1$ to the UE. For example, the set of $L_1$ is {2, 4, 8}. Alternatively, the base station may further preconfigure an algorithm, and the base station may calculate $L_1$ based on the preconfigured algorithm. For example, assuming that $L_1$ is defined as a ratio of a physical antenna quantity to an antenna port quantity of the base station, the base station may calculate $L_1$ based on the ratio of the physical antenna quantity to the antenna port quantity.

Alternatively, the base station and the UE may alternatively agree on the quantity $L_1$ in advance. In this case, the base station may not send the quantity $L_1$ to the UE.

The base station and the UE may further agree on in advance locations of the $L_1$ symbols in the uplink subframe that are used to send an SRS. For example, the $L_1$ symbols used to send an SRS are concentrated on the last $L_1$ symbols in the uplink subframe.

Optionally, the cell-specific SRS subframe configuration table preconfigured in the base station may further include a value of $L_1$, as shown in Table 7.

Bit information may be added to the cell-specific SRS subframe configuration parameter field srs-SubframeConfig stipulated in an existing protocol to indicate $L_1$. A predefined new cell-specific SRS subframe configuration parameter field (for example, a field srs-SubframeConfig-BF) may indicate SRS subframe configuration parameters of an SRS configuration period, a transmission offset, and $L_1$ included in the cell-specific SRS subframe configuration table shown in Table 7. However, this is not limited in this embodiment of the present application, and the base station may alternatively send indication information about $L_1$ to the UE in another manner.

TABLE 7

Cell-level SRS subframe configuration table

| SRS subframe configuration srs-SubframeConfig-BF | Configuration period $T_{SFC}$ (ms) (Configuration Period) | Transmission offset $\Delta_{SFC}$ (Transmission offset) | $L_1$ |
|---|---|---|---|
| 0 | None | None | None |
| 1 | 10 | {1,2,3,4,6,7,8,9} | 2 |
| 2 | 10 | {1,2,3,4,6,7,8,9} | 4 |
| 3 | 10 | {1,2,3,4,6,7,8,9} | 8 |
| 4-5 | 20 | 10 × (srs-SubframeConfig-BF-4) + {1,2,3,4,6,7,8,9} | 2 |
| 6-7 | 20 | 10 × (srs-SubframeConfig-BF-6) + {1,2,3,4,6,7,8,9} | 4 |
| 8-9 | 20 | 10 × (srs-SubframeConfig-BF-8) + {1,2,3,4,6,7,8,9} | 8 |
| 10-13 | 40 | 10 × (srs-SubframeConfig-BF-10) + {1,2,3,4,6,7,8,9} | 2 |
| 14-17 | 40 | 10 × (srs-SubframeConfig-BF-14) + {1,2,3,4,6,7,8,9} | 4 |

TABLE 7-continued

Cell-level SRS subframe configuration table

| SRS subframe configuration srs-SubframeConfig-BF | Configuration period $T_{SFC}$ (ms) (Configuration Period) | Transmission offset $\Delta_{SFC}$ (Transmission offset) | $L_1$ |
|---|---|---|---|
| 18-21 | 40 | 10 × (srs-SubframeConfig-BF-18) + {1,2,3,4,6,7,8,9} | 8 |
| 22-29 | 80 | 10 × (srs-SubframeConfig-BF-22) + {1,2,3,4,6,7,8,9} | 2 |
| 30-37 | 80 | 10 × (srs-SubframeConfig-BF-30) + {1,2,3,4,6,7,8,9} | 4 |
| 38-45 | 80 | 10 × (srs-SubframeConfig-BF-38) + {1,2,3,4,6,7,8,9} | 8 |
| 46-61 | 160 | 10 × (srs-SubframeConfig-BF-46) + {1,2,3,4,6,7,8,9} | 2 |
| 62-77 | 160 | 10 × (srs-SubframeConfig-BF-62) + {1,2,3,4,6,7,8,9} | 4 |
| 78-93 | 160 | 10 × (srs-SubframeConfig-BF-78) + {1,2,3,4,6,7,8,9} | 8 |
| 94-127 | reserved (reserved) | reserved (reserved) | reserved (reserved) |

In the embodiments of the present application, the plurality of UE-specific SRS subframe configuration tables may include the periodic UE-specific SRS subframe configuration table or the aperiodic UE-specific SRS subframe configuration table stipulated in an existing protocol shown in Table 3 and Table 4 and another preconfigured UE-specific SRS subframe configuration table. It should be noted that the embodiments of the present application are not limited to the example of the UE-specific SRS subframe configuration table shown in Table 8, Table 9, and Table 16.

It should be noted that in this embodiment of the present application, each cell-specific SRS subframe configuration table corresponds to at least one UE-specific SRS subframe configuration table.

A new UE-specific SRS subframe configuration parameter field (for example, a field srs-ConfigIndex-Prebf) may be predefined to indicate an SRS subframe configuration parameter in another periodic UE-specific SRS subframe configuration table. Similarly, a new aperiodic UE-specific SRS subframe configuration parameter field (for example, a field srs-ConfigIndexAp-Prebf) may be alternatively predefined to indicate an SRS subframe configuration parameter in another aperiodic UE-specific SRS subframe configuration table.

TABLE 8

UE-specific SRS subframe configuration table

| SRS configuration index $I_{SRS,2}$ (SRS Configuration Index) | SRS periodicity $T_{SRS}$ (ms) (SRS Periodicity) | SRS subframe offset $T_{offset}$ (SRS Subframe Offset) |
|---|---|---|
| 0-5 | 10 | Table 10 |
| 6-17 | 20 | Table 11 |
| 18-41 | 40 | Table 12 |
| 42-89 | 80 | Table 13 |
| 90-185 | 160 | Table 14 |
| 186-377 | 320 | Table 15 |
| 378-511 | reserved (reserved) | reserved (reserved) |

TABLE 9

UE-specific SRS subframe configuration table

| SRS configuration index $I_{SRS,2}$ (SRS Configuration Index) | SRS periodicity $T_{SRS}$ (ms) (SRS Periodicity) | SRS subframe offset $T_{offset}$ (SRS Subframe Offset) |
|---|---|---|
| 0-9 | 10 | $I_{SRS,2}$ |
| 10-29 | 20 | $I_{SRS,2}$-10 |
| 30-69 | 40 | $I_{SRS,2}$-30 |
| 70-149 | 80 | $I_{SRS,2}$-70 |
| 150-309 | 160 | $I_{SRS,2}$-150 |
| 310-629 | 320 | $I_{SRS,2}$-310 |
| 630-1023 | reserved (reserved) | reserved (reserved) |

TABLE 10

| $I_{SRS,2}$ mod 6 | 0 | 1 | 2 | 3 | 4 | 5 |
|---|---|---|---|---|---|---|
| $T_{offset}$ − 10 × $\lfloor I_{SRS,2}/6 \rfloor$ | 2 | 3 | 4 | 7 | 8 | 9 |

TABLE 11

| $I_{SRS,2}$ mod 6 | 0 | 1 | 2 | 3 | 4 | 5 |
|---|---|---|---|---|---|---|
| $T_{offset}$ − 10 × $\lfloor (I_{SRS,2} - 6)/6 \rfloor$ | 2 | 3 | 4 | 7 | 8 | 9 |

TABLE 12

| $I_{SRS,2}$ mod 6 | 0 | 1 | 2 | 3 | 4 | 5 |
|---|---|---|---|---|---|---|
| $T_{offset}$ − 10 × $\lfloor (I_{SRS,2} - 18)/6 \rfloor$ | 2 | 3 | 4 | 7 | 8 | 9 |

TABLE 13

| $I_{SRS, 2}$ mod 6 | 0 | 1 | 2 | 3 | 4 | 5 |
|---|---|---|---|---|---|---|
| $T_{offset} - 10 \times \lfloor (I_{SRS, 2} - 42)/6 \rfloor$ | 2 | 3 | 4 | 7 | 8 | 9 |

TABLE 14

| $I_{SRS, 2}$ mod 6 | 0 | 1 | 2 | 3 | 4 | 5 |
|---|---|---|---|---|---|---|
| $T_{offset} - 10 \times \lfloor (I_{SRS, 2} - 90)/6 \rfloor$ | 2 | 3 | 4 | 7 | 8 | 9 |

TABLE 15

| $I_{SRS, 2}$ mod 6 | 0 | 1 | 2 | 3 | 4 | 5 |
|---|---|---|---|---|---|---|
| $T_{offset} - 10 \times \lfloor (I_{SRS, 2} - 186)/6 \rfloor$ | 2 | 3 | 4 | 7 | 8 | 9 |

TABLE 16

UE-specific SRS subframe configuration table

| SRS configuration index $I_{SRS,2}$ (SRS Configuration Index) | SRS periodicity $T_{SRS}$ (ms) (SRS Periodicity) | SRS subframe offset $T_{offset}$ (SRS Subframe Offset) |
|---|---|---|
| 0 | 10 | 2 |
| 1 | 10 | 3 |
| 2 | 10 | 4 |
| 3 | 10 | 7 |
| 4 | 10 | 8 |
| 5 | 10 | 9 |
| 6-7 | reserved (reserved) | reserved (reserved) |

The foregoing describes the cell-specific SRS subframe configuration table and the UE-specific SRS subframe configuration table in the embodiments of the present application, and the following describes an SRS configuration method in an embodiment of the present application with reference to FIG. 1.

Figure 2:
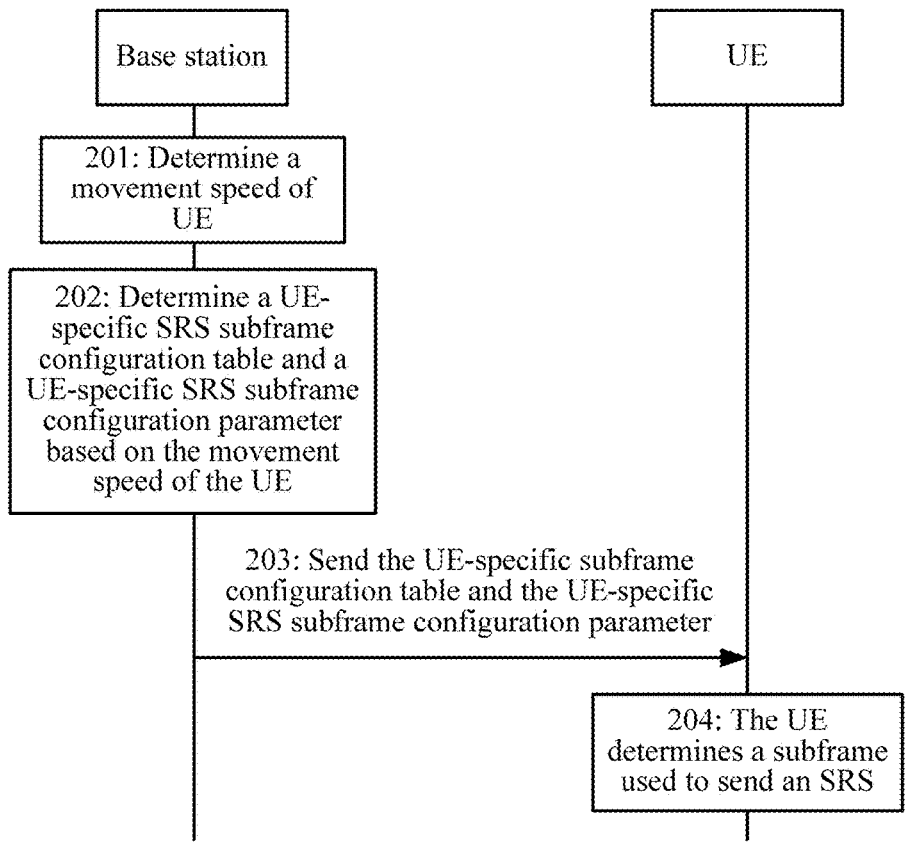
FIG. 2 is a schematic flowchart of an SRS configuration method according to an embodiment of the present application.

FIG. 2 is a schematic flowchart of an SRS configuration method 200 according to an embodiment of the present application.

201: A base station determines a movement speed of UE.

For example, the base station may determine the movement speed of the UE based on the location information reported by the UE.

202: The base station determines, based on the movement speed of the UE, a UE-specific SRS subframe configuration table in a plurality of UE-specific SRS subframe configuration tables corresponding to a used cell-specific SRS subframe configuration table, and determines a UE-specific SRS subframe configuration parameter in the determined UE-specific subframe configuration table, where the UE-specific SRS subframe configuration parameter is used to indicate a subframe used to send an SRS.

The plurality of UE-specific SRS subframe configurations may correspond to different speed intervals. For example, a first UE-specific SRS subframe configuration table of the plurality of UE-specific SRS subframe configuration tables corresponds to a speed interval [$v_1$, $v_2$], a second UE-specific SRS subframe configuration table corresponds to a speed interval [$v_3$, $v_4$], and so on. Details are not described again.

The UE-specific SRS subframe configuration parameter may be a periodic SRS subframe configuration parameter or an aperiodic SRS subframe configuration parameter.

203: The base station sends the UE-specific SRS subframe configuration parameter and identification information of the UE-specific subframe configuration table to the UE.

Optionally, the UE-specific SRS subframe configuration parameter and the identification information of the UE-specific subframe configuration table may be carried in a same configuration field. Correspondingly, the step 203 includes: sending, by the base station, a message to the UE, where a field of the message carries the UE-specific SRS subframe configuration parameter and the identification information of the UE-specific SRS subframe configuration table.

For example, bit information with a particular length (for example, one bit) may be added to a UE-specific SRS subframe configuration field stipulated in an existing protocol, to identify the UE-specific SRS subframe configuration table. For a periodic SRS, the UE-specific SRS subframe configuration parameter and the identification information of the UE-specific SRS subframe configuration table may be carried in a field srs-ConfigIndex. For an aperiodic SRS, the UE-specific SRS subframe configuration parameter and the identification information of the UE-specific SRS subframe configuration table are carried in a field srs-ConfigIndexAp-r10.

For another example, a new UE-specific SRS subframe configuration field such as srs-ConfigIndex-Prebf or srs-ConfigIndexAp-Prebf may alternatively be defined. For a periodic SRS, the UE-specific SRS subframe configuration parameter and the identification information of the UE-specific SRS subframe configuration table may be carried in a field srs-ConfigIndex-Prebf. For an aperiodic SRS, the UE-specific SRS subframe configuration parameter and the identification information of the UE-specific SRS subframe configuration table are carried in a field srs-ConfigIndexAp-Prebf.

It should be understood that the UE-specific SRS subframe configuration parameter and the identification information of the UE-specific subframe configuration table may alternatively be carried in different configuration fields. This is not limited in this embodiment of the present application.

In consideration of compatibility with the prior art, if the UE-specific SRS subframe configuration table determined in step 202 is stipulated in an existing protocol, the UE-specific SRS subframe configuration parameter may be carried in a field srs-ConfigIndex or a field srs-ConfigIndexAp-r10 sent by the base station to the UE. In this case, the identification information of the UE-specific SRS subframe configuration table may not be sent by default, or may be sent to the UE by using another field or information element.

In this embodiment of the present application, the base station may determine, based on the movement speed of the UE, the UE-specific SRS subframe configuration table and the UE-specific SRS subframe configuration parameter allocated to the UE. In this way, SRS time domain resources having different densities may be allocated to UEs having different movement speeds, to not only satisfy an SRS requirement of the base station for obtaining complete channel information, to help the base station obtain complete channel information, but also avoid time domain resource waste.

Figure 3:
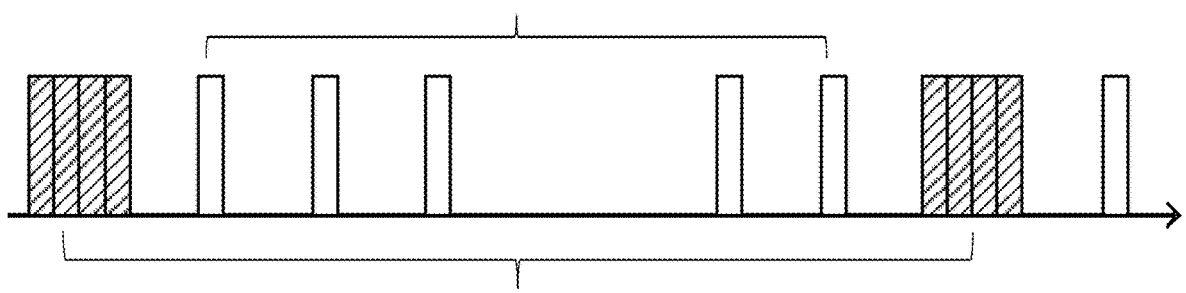
FIG. 3 is a schematic diagram of resource configuration of SRSs having different densities according to an embodiment of the present application.

FIG. 3 is a schematic diagram of resource configuration of SRSs having different densities. For example, a low-density SRS may be used to obtain an effective channel, or may be used by UE whose movement speed is lower than a preset threshold to obtain complete channel information, and a high-density SRS may be used by UE whose movement speed is higher than the preset threshold to obtain complete channel information.

It should be noted that in step 202, the base station may determine one or more UE-specific SRS subframe configuration parameters in the UE-specific subframe configuration table. Correspondingly, in step 203, the base station may send the determined one or more UE-specific SRS subframe configuration parameters to the UE. The UE may select at least one SRS subframe configuration parameter from the received one or more UE-specific SRS subframe configuration parameters, and send an SRS in a subframe indicated by the SRS subframe configuration parameter.

204: The UE determines, based on the received UE-specific SRS subframe configuration parameter and the received identification information of the UE-specific SRS subframe configuration table, a subframe used to send an SRS.

Specifically, the UE finds, from a preconfigured plurality of UE-specific SRS subframe configuration tables based on the identification information of the UE-specific SRS subframe configuration table, the UE-specific SRS subframe configuration table allocated by the base station, and determines, in the UE-specific SRS subframe configuration table based on the UE-specific SRS subframe configuration parameter, a subframe used to send an SRS.

If the UE-specific SRS subframe configuration parameter is a periodic SRS subframe configuration parameter, the UE may periodically send an SRS in a specified subframe used to send an SRS.

If the UE-specific SRS subframe configuration parameter is an aperiodic SRS subframe configuration parameter, after receiving trigger information delivered by the base station, the UE sends an SRS in a specified subframe used to send an SRS.

Optionally, when a plurality of cell-specific SRS subframe configuration tables are configured in the base station and the UE, before the UE-specific SRS subframe configuration table is determined, the used cell-specific SRS subframe configuration table further needs to be determined. Correspondingly, the method 200 may further include:

201': The base station determines movement speeds of all UEs in a cell.

It should be noted that after step 201' is performed, because the movement speeds of all the UEs in the cell includes the movement speed of the UE, step 201 may not be performed.

202': The base station determines the used cell-specific SRS subframe configuration table in a plurality of cell-specific SRS subframe configuration tables based on the movement speeds of all the UEs in the cell, and determines a cell-specific SRS subframe configuration parameter in the determined cell-specific SRS subframe configuration table, where the cell-specific SRS subframe configuration parameter is used to indicate a subframe set used to send an SRS in the cell.

The currently used cell-specific SRS subframe configuration table may be determined in step 202', and step 202' is performed before step 202.

Optionally, the base station may determine the used cell-specific SRS subframe configuration table in the plurality of cell-specific SRS subframe configuration tables based on an average movement speed of all the UEs in the cell.

203': The base station sends the cell-specific SRS subframe configuration parameter and identification information of the used cell-specific SRS subframe configuration set to the UE.

Optionally, the cell-specific SRS subframe configuration parameter and the identification information of the cell-specific SRS subframe configuration table may be carried in a same configuration field. Correspondingly, the step 203' includes: sending, by the base station, a message to the UE, where a field of the message carries the cell-specific SRS subframe configuration parameter and the identification information of the cell-specific SRS subframe configuration table.

For example, identification information with a particular length (for example, one bit) may be added to a cell-specific SRS subframe configuration field stipulated in an existing protocol, to indicate the cell-specific SRS subframe configuration table. The cell-specific SRS subframe configuration parameter and the identification information of the cell-specific SRS subframe configuration table may be carried in a field srs-SubframeConfig.

For another example, a new cell SRS subframe configuration field such as srs-SubframeConfig-BF may be alternatively defined. The cell-specific SRS subframe configuration parameter and the identification information of the cell-specific SRS subframe configuration table may be carried in the field srs-SubframeConfig-BF.

Srs-SubframeConfig or srs-SubframeConfig-BF may be delivered to the UE by using a system information block (System Information Block, SIB) 2.

It should be understood that the cell-specific SRS subframe configuration parameter and the identification information of the cell-specific SRS subframe configuration table may alternatively be carried in different configuration fields. This is not limited in this embodiment of the present application.

In consideration of compatibility with the prior art, if the cell-specific SRS subframe configuration table determined in step 202' is stipulated in an existing protocol, the cell-specific SRS subframe configuration parameter is carried in a field srs-SubframeConfig sent by the base station to the UE, which is the same as the prior art. In this case, the identification information of the cell-specific SRS subframe configuration table may not be sent by default, or may be sent to the UE by using another field or information element.

It should be noted that steps 203 and 203' may be simultaneously performed, or may be non-simultaneously performed. This is not limited in this embodiment of the present application.

The base station may simultaneously send cell-specific SRS configuration information and UE-specific SRS configuration information to the UE, or may send only the UE-specific SRS configuration information to the UE. For example, within a particular time after the base station sends the cell-specific SRS configuration information to the UE, when the base station configures an SRS resource for the UE again, the base station may send only the UE-specific SRS configuration information to the UE.

204': The UE determines, based on the cell-specific SRS subframe configuration parameter and the identification information of the used cell-specific SRS subframe configuration set sent by the base station, a subframe set used to send an SRS in the cell.

This can avoid transmitting a physical uplink shared channel (Physical Uplink Shared Channel, PUSCH) on a symbol that is in a subframe used by another UE in the cell to send an SRS and that is used to send an SRS.

Optionally, the method 200 may further include: sending, by the base station, a quantity $L_1$ to the UE, where $L_1$ is a maximum quantity of symbols that are in a subframe and that are used to send an SRS, and $L_1$ is a positive integer greater than 1.

In this embodiment of the present application, indication information about $L_1$ may be added to the existing cell-specific SRS subframe configuration parameter field srs-SubframeConfig. Alternatively, the indication information about $L_1$ may be added to the existing UE-specific SRS subframe configuration parameter fields srs-ConfigIndex and srs-ConfigIndexAp-r10. However, this embodiment of the present application is not limited thereto, and a new cell-specific SRS subframe configuration parameter field (for example, a field srs-SubframeConfig-BF) or a new UE-specific SRS subframe configuration parameter field (for example, a field srs-ConfigIndex-Prebf) may be alternatively defined. The cell-specific SRS subframe configuration parameter field or the UE-specific SRS subframe configuration parameter field carries the indication information about $L_1$.

A location of a symbol that is in a subframe and that is used to send an SRS may be preconfigured in the base station and the UE, or may be agreed on by the base station and the UE in advance.

For example, locations of $L_1$ symbols that are in a subframe and that are used to send an SRS may be concentrated on the last $L_1$ symbols in the subframe.

Correspondingly, based on the received quantity $L_1$, the UE can be prevented from transmitting a PUSCH on a symbol of a subframe that may be used by another UE in the cell to send an SRS.

Optionally, the method 200 may further include: sending, by the base station, indication information to the UE. For an aperiodic SRS, the indication information is used to instruct the UE to send $L_2$ SRSs after the aperiodic SRS is triggered. For a periodic SRS, the indication information may be used to instruct the UE to send the $L_2$ SRSs in each period. $L_2$ is a positive integer greater than 1 and less than or equal to $L_1$. Correspondingly, the UE may send $L_2$ aperiodic SRSs based on the received indication information after receiving triggering of an aperiodic SRS, or send $L_2$ periodic SRSs in each period. Optionally, the indication information sent by the base station is further used to indicate a manner used to send the $L_2$ SRSs. Correspondingly, the UE sends the $L_2$ SRSs based on the manner indicated by the indication information.

In other words, the base station may notify the UE of a quantity of SRSs sent after the aperiodic SRS is triggered, or a quantity of SRSs sent in each period.

It should be understood that the base station and the UE may further predetermine the quantity of SRSs sent by the UE after the aperiodic SRS is triggered, or the quantity $L_2$ of SRSs sent by the UE in each period. For example, the quantity $L_2$ is equal to $L_1$. In this case, the base station needs to send only the indication information to the UE, to indicate a manner used to send an SRS. That is, the method 200 may further include: sending the indication information to the UE, where the indication information is used to indicate a manner used by the UE to send the $L_2$ SRSs after an aperiodic SRS is triggered, or is used to indicate a manner used by the UE to send the $L_2$ SRSs in each period.

Optionally, the manner used to send the $L_2$ SRSs may be determined by the base station based on the movement speed of the UE. The base station may instruct, based on the movement speed of the UE, the UE to send the $L_2$ SRSs by using the plurality of different manners. For example, the base station may preconfigure a correspondence between the movement speed of the UE and an SRS sending manner.

Optionally, the manner includes: sending the $L_2$ SRSs in one subframe indicated by the UE-specific SRS subframe configuration parameter. For example, the $L_2$ SRSs may be continuously sent on the last $L_2$ symbols of the subframe.

For a special subframe, a length of an UpPTS is one or two symbols. As a result, one special subframe can be used to continuously send a maximum of only two SRSs. Therefore, in this scenario, an uplink subframe may be configured in the UE-specific SRS subframe configuration table to send an SRS, to further increase a density of sending an SRS by the UE, and to be applied to a high-speed movement scenario of the UE.

For example, it can be learned from Table 1 that subframe offsets 1 and 6 correspond to special subframes. The UE-specific SRS subframe configuration tables shown in Table 8 and Table 16 do not include configurations whose SRS subframe offsets are 1 and 6. Therefore, if Table 8 and Table 16 are used for SRS configuration in this scenario, the UE may send more than two SRSs in one uplink subframe. This helps the base station obtain complete channel information in a high-speed movement scenario of the UE. For example, Table 8 may be used for subframe configuration of a periodic SRS, and Table 16 may be used for subframe configuration of an aperiodic SRS. It should be understood that this is used only as an example for description, and is not limited in this embodiment of the present application.

Optionally, the manner includes: sending the $L_2$ SRSs in a plurality of subframes starting from a subframe indicated by the UE-specific SRS subframe configuration parameter. For example, in this scenario, Table 9 may be used for subframe configuration of a periodic SRS, and Table 3 may be used for subframe configuration of an aperiodic SRS. Similarly, this is used only as an example for description, and is not limited in this embodiment of the present application.

Optionally, the sending the $L_2$ SRSs in a plurality of subframes starting from a subframe indicated by the UE-specific SRS subframe configuration parameter includes: transmitting Y SRSs in an $n^{th}$ subframe counted from the subframe indicated by the UE-specific SRS subframe configuration parameter, until the $L_2$ SRSs are sent, where $$Y = \min\left(L_2 - \sum_{m=1}^{n-1} X_m, X_n\right);$$

$$X_n = \begin{cases} 1, n \text{ is a special subframe and a length of an } UpPTS \text{ is one symbol} \\ 2, n \text{ is a special subframe and a length of an } UpPTS \text{ is two symbols} \\ \left\lceil \frac{L_2}{N} \right\rceil, n \text{ is a normal subframe} \end{cases};$$

and

N is a positive integer greater than or equal to 2 and less than or equal to $L_2$, a normal subframe is an uplink subframe shown in Table 1, and ⌈⌉ indicates rounding up.

A value of N is related to the movement speed of the UE, and a higher movement speed of the UE indicates a smaller value of N.

Information whose length may be two bits (bit) may be used to indicate the manner used to send the $L_2$ SRSs, as shown in Table 17. It should be understood that based on a combination of values of N and $L_2$, information having another length may alternatively be used to indicate the manner used to send the $L_2$ SRSs.

TABLE 17

| | |
|---|---|
| 00 | $L_2$ SRSs are continuously sent in one subframe |
| 01 | Starting from a subframe specified by $T_{offset}$, a quantity of SRSs sent in an $n^{th}$ subframe is $\min\left(L_2 - \sum_{m=1}^{n-1} X_m, X_n\right)$, until symbols of the $L_2$ SRSs are sent, where n = 1, 2, ..., and N = 2 |
| 10 | Starting from a subframe specified by $T_{offset}$, a quantity of SRSs sent in an $n^{th}$ subframe is $\min\left(L_2 - \sum_{m=1}^{n-1} X_m, X_n\right)$, until symbols of the $L_2$ SRSs are sent, where n = 1, 2, ..., and N = 4 |
| 11 | Starting from a subframe specified by $T_{offset}$, a quantity of SRSs sent in an $n^{th}$ subframe is $\min\left(L_2 - \sum_{m=1}^{n-1} X_m, X_n\right)$, until symbols of the $L_2$ SRSs are sent, where n = 1, 2, ..., and N = $L_2$ |

Figure 4:
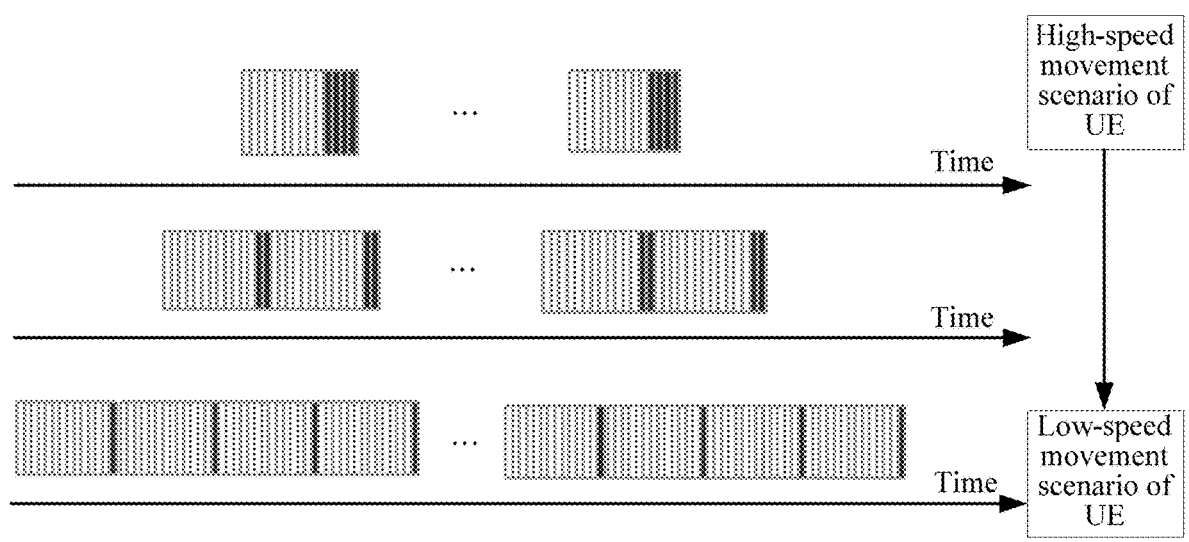
FIG. 4 is a schematic diagram of an SRS sending manner according to an embodiment of the present application.

As shown in FIG. 4, assuming that four SRSs are sent in one period, when the movement speed of the UE $V>V_1$, the base station may instruct the UE to continuously send four SRSs in one subframe satisfying a condition. When the movement speed of the UE $V_2<V<V_1$, the base station may instruct the UE to continuously send two SRSs in each of two subframes satisfying a condition. When the movement speed of the UE $V<V_2$, the base station may instruct the UE to send one SRS in each of four subframes satisfying a condition. When the movement speed of the UE V is a critical value of movement speeds corresponding to two sending manners, the base station may instruct the UE to send an SRS by using any one of the two sending manners. For example, when $V=V_2$, the base station may instruct the UE to continuously send two SRSs in each of two subframes satisfying a condition, or instruct the UE to send one SRS in each of four subframes satisfying a condition.

Figure 5:
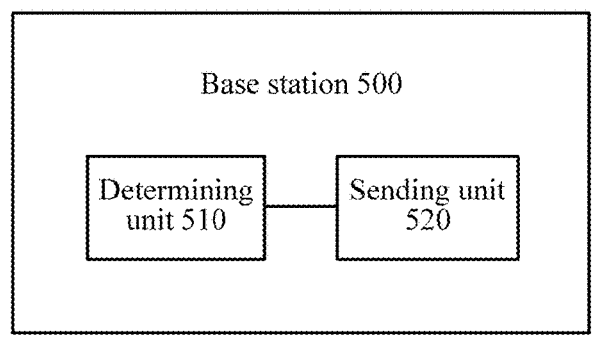
FIG. 5 is a schematic structural diagram of a base station according to an embodiment of the present application.

FIG. 5 is a schematic structural diagram of a base station 500 according to an embodiment of the present application. The base station 500 is configured to perform the method performed by the base station in the method 200 shown in FIG. 2. The base station 500 may include a determining unit 510 and a sending unit 520.

The determining unit 510 is configured to: determine a movement speed of user equipment UE, determine, based on the movement speed of the UE, a UE-specific subframe configuration set in a plurality of UE-specific SRS subframe configuration sets corresponding to a used cell-specific SRS subframe configuration set, and determine a UE-specific SRS subframe configuration parameter in the determined UE-specific subframe configuration set, where the UE-specific SRS subframe configuration parameter is used to indicate a subframe used to send an SRS.

The sending unit 520 is configured to send the UE-specific SRS subframe configuration parameter and identification information of the UE-specific subframe configuration set determined by the determining unit to the UE.

The UE-specific SRS subframe configuration set allocated to the UE is determined in a plurality of UE-specific SRS subframe configuration sets based on the movement speed of the UE, and the UE-specific SRS subframe configuration parameter is determined in the UE-specific SRS subframe configuration set, so that a density of sending an SRS by the UE can be adaptively adjusted based on the movement speed of the UE, to help the base station obtain complete channel information. In addition, SRS resource waste can be avoided.

Optionally, the UE 500 may further include a receiving unit, configured to receive an SRS and another uplink signal sent by an UE.

Optionally, the determining unit 510 is further configured to: determine movement speeds of all UEs in a cell, determine the used cell-specific SRS subframe configuration set in a plurality of cell-specific SRS subframe configuration sets based on the movement speeds of all the UEs in the cell, and determine a cell-specific SRS subframe configuration parameter in the cell-specific SRS subframe configuration set, where the cell-specific SRS subframe configuration parameter is used to indicate a subframe set used to send an SRS in the cell. Correspondingly, the sending unit 520 is further configured to send identifiers of the cell-specific SRS subframe configuration parameter and the cell-specific SRS subframe configuration set determined by the determining unit to the UE.

Optionally, the sending unit 520 is further configured to send a quantity $L_1$ to the UE, where $L_1$ is a maximum quantity of symbols that are in a subframe and that are used to send an SRS, and $L_1$ is a positive integer greater than 1.

Optionally, the sending unit 520 is further configured to send indication information to the UE, where the indication information is used to instruct the UE to send $L_2$ SRSs after triggering an aperiodic SRS, or is used to instruct the UE to send $L_2$ SRSs in each period. Optionally, the indication information is further used to indicate a manner used to send the $L_2$ SRSs, where $L_2$ is a positive integer greater than 1 and less than or equal to $L_1$.

Alternatively, the sending unit 520 is further configured to send the indication information to the UE, where the indication information is used to indicate a manner used by the UE to send the $L_2$ SRSs after an aperiodic SRS is triggered, or is used to indicate a manner used by the UE to send the $L_2$ SRSs in each period, and $L_2$ is a positive integer greater than 1 and less than or equal to $L_1$.

Optionally, the manner includes: sending the $L_2$ SRSs in one subframe indicated by the UE-specific SRS subframe configuration parameter. Optionally, the manner includes: sending the $L_2$ SRSs in a plurality of subframes starting from a subframe indicated by the UE-specific SRS subframe configuration parameter.

Optionally, the sending the $L_2$ SRSs in a plurality of subframes starting from a subframe indicated by the UE-specific SRS subframe configuration parameter includes: transmitting Y SRSs in an $n^{th}$ subframe counted from the subframe indicated by the SRS subframe configuration parameter, until the $L_2$ SRSs are sent, where $$Y = \min\left(L_2 - \sum_{m=1}^{n-1} X_m, X_n\right);$$

$X_n =$
$$\begin{cases} 1, n \text{ is a special subframe and a length of an } UpPTS \text{ is one symbol} \\ 2, n \text{ is a special subframe and a length of an } UpPTS \text{ is two symbols} \\ \left\lceil \frac{L_2}{N} \right\rceil, n \text{ is a normal subframe} \end{cases};$$

and

N is a positive integer greater than or equal to 2 and less than or equal to $L_2$.

Figure 6:
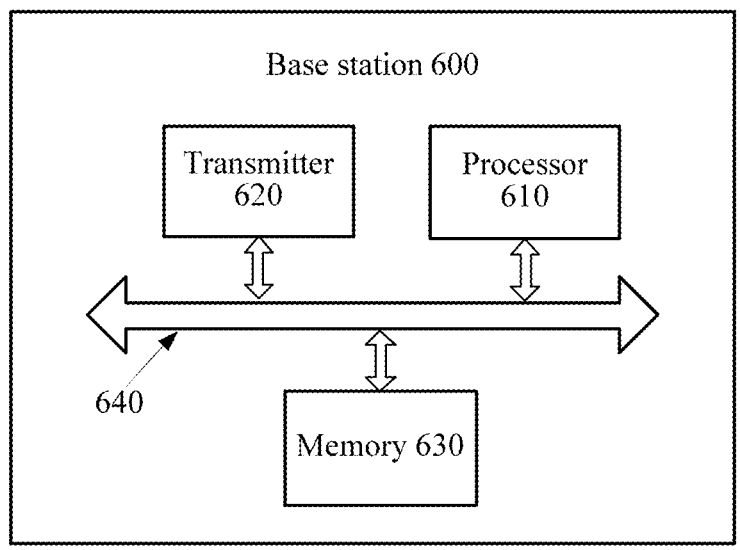
FIG. 6 is a schematic structural diagram of a base station according to another embodiment of the present application.

It should be noted that in this embodiment of the present application, the determining unit 510 may be implemented by a processor, and the sending unit may be implemented by a transmitter. As shown in FIG. 6, the base station 600 may include a processor 610, a transmitter 620, a memory 630, and a bus system 640, and the processor 610, the transmitter 620, and the memory 630 are connected by using the bus system 640. The memory 630 may be configured to store code executed by the processor 610 and the like.

The bus system 640 further includes a power supply bus, a control bus, and a status signal bus in addition to a data bus.

Optionally, the base station 600 may further include a receiver, configured to receive an SRS and another uplink signal sent by an UE.

The base station 500 shown in FIG. 5 and the base station 600 shown in FIG. 6 can implement various processes implemented by the base station in the foregoing method embodiment, and to avoid repetition, details are not described herein again.

It should be noted that the foregoing method embodiment of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or transistor logic device, or a discrete hardware component. It may implement or perform the methods, the steps, and logical block diagrams that are disclosed in the embodiments of the present application. The general purpose processor may be a microprocessor, or the processor may be any conventional processor or the like. Steps of the methods disclosed with reference to the embodiments of the present application may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DR RAM). It should be noted that the memory of the systems and methods described in this specification is intended to include, but is not limited to, these and any memory of another proper type.

Figure 7:
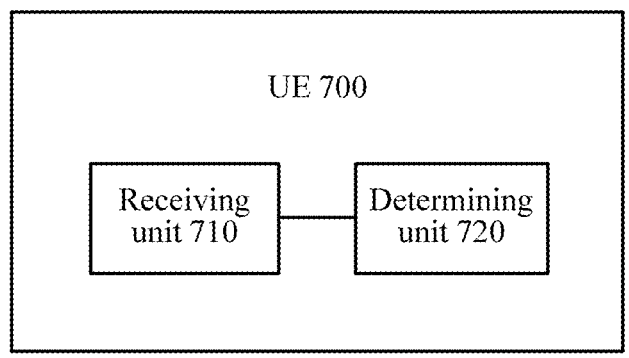
FIG. 7 is a schematic structural diagram of user equipment according to an embodiment of the present application.

FIG. 7 is a schematic structural diagram of UE 700 according to an embodiment of the present application. As shown in FIG. 7, the UE 700 includes a receiving unit 710 and a determining unit 720.

The receiving unit 710 is configured to receive identifiers of a UE-specific SRS subframe configuration parameter and a UE-specific subframe configuration set to which the UE-specific SRS subframe configuration parameter belongs, where the identifiers are sent by a base station, and the UE-specific subframe configuration set is determined by the base station based on a movement speed of the UE in a plurality of UE-specific subframe configuration sets corresponding to a used cell-specific SRS subframe configuration set.

The determining unit 720 is configured to determine, based on the identifiers of the UE-specific SRS subframe configuration parameter and the UE-specific subframe configuration set received by the receiving unit, a subframe used to send an SRS.

The identifier of the UE-specific SRS subframe configuration set determined by the base station based on the movement speed of the UE and the UE-specific SRS subframe configuration parameter are received, and the subframe used to send an SRS is determined based on the two, so that the sent SRS can satisfy an SRS requirement when the base station obtains complete channel information.

Optionally, the UE 700 may further include a sending unit, configured to send an SRS and another uplink signal.

Optionally, the receiving unit 710 is further configured to receive identifiers of a cell-specific SRS subframe configuration parameter and the cell-specific SRS subframe configuration set to which the cell-specific SRS subframe configuration parameter belongs, where the identifiers are sent by the base station, and the cell-specific SRS subframe configuration set is determined by the base station in a plurality of cell-specific SRS subframe configuration sets based on movement speeds of all UEs in a cell. Correspondingly, the determining unit 720 is further configured to determine, based on the identifiers of the cell-specific SRS subframe configuration parameter and the cell-specific SRS subframe configuration sets received by the receiving unit, a subframe set used to send an SRS in the cell.

The identifier of the used cell-specific SRS subframe configuration set determined by the base station based on the movement speeds of all the UEs in the cell and the cell-specific SRS subframe configuration parameter are received, and the subframe set used to send an SRS in the cell is determined based on the two. Therefore, subframe sets in which UE may send an SRS can be determined, to avoid transmitting a physical uplink shared channel PUSCH in a subframe that may be used by another UE in the cell to send an SRS.

Optionally, the receiving unit 710 is further configured to receive a quantity $L_1$ sent by the base station, where $L_1$ is a maximum quantity of symbols that are in a subframe and that are used to send an SRS, and $L_1$ is a positive integer greater than 1.

Optionally, the receiving unit 710 is further configured to receive indication information sent by the base station, where the indication information is used to instruct the UE to send $L_2$ SRSs after triggering an aperiodic SRS, or the indication information is used to instruct the UE to send $L_2$ SRSs in each period, and $L_2$ is a positive integer greater than 1 and less than or equal to $L_1$.

Optionally, the indication information is further used to indicate a manner used to send the $L_2$ SRSs.

Optionally, the manner includes: sending the $L_2$ SRSs in one subframe indicated by the UE-specific SRS subframe configuration parameter. Alternatively, the manner includes: sending the $L_2$ SRSs in a plurality of subframes starting from a subframe indicated by the UE-specific SRS subframe configuration parameter.

Optionally, the sending the $L_2$ SRSs in a plurality of subframes starting from a subframe indicated by the UE-specific SRS subframe configuration parameter includes: transmitting Y SRSs in an $n^{th}$ subframe counted from the subframe indicated by the UE-specific SRS subframe configuration parameter, until the $L_2$ SRSs are sent, where $$Y = \min\left(L_2 - \sum_{m=1}^{n-1} X_m, X_n\right);$$

$X_n =$
$\begin{cases} 1, n \text{ is a special subframe and a length of an } UpPTS \text{ is one symbol} \\ 2, n \text{ is a special subframe and a length of an } UpPTS \text{ is two symbols} \\ \left\lceil \frac{L_2}{N} \right\rceil, n \text{ is a normal subframe} \end{cases}$;

and

N is a positive integer greater than or equal to 2 and less than or equal to $L_2$.

Figure 8:
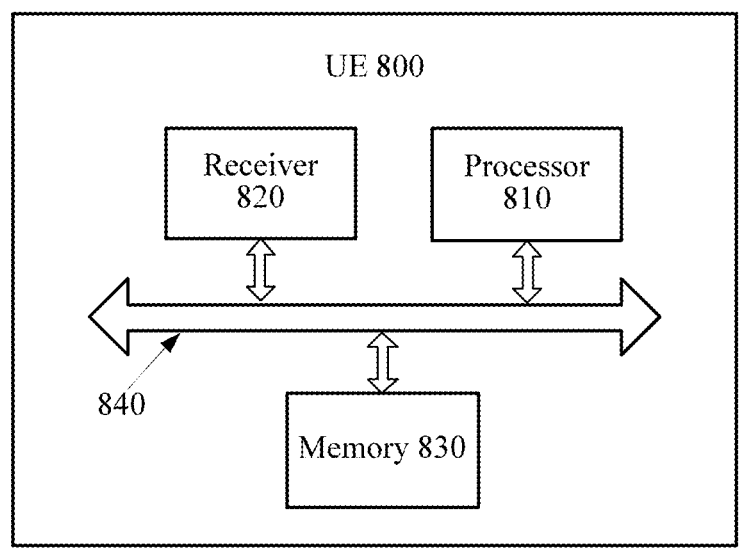
FIG. 8 is a schematic structural diagram of user equipment according to another embodiment of the present application.

It should be noted that in this embodiment of the present application, the receiving unit 710 may be implemented by a receiver, and the determining unit 720 may be implemented by a processor. As shown in FIG. 8, the UE 800 may include a processor 810, a receiver 820, a memory 830, and a bus system 840, and the processor 810, the receiver 820, and the memory 830 are connected by using the bus system 840. The memory 830 may be configured to store code executed by the processor 810 and the like.

The bus system 840 further includes a power supply bus, a control bus, and a status signal bus in addition to a data bus.

Optionally, the UE 800 may further include a transmitter, configured to send an SRS and another uplink signal.

The UE 700 shown in FIG. 7 and the UE 800 shown in FIG. 8 can implement various processes implemented by the UE in the foregoing method embodiment, and to avoid repetition, details are not described herein again.

It should be noted that the foregoing method embodiment of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general-purpose processor, a DSP, an ASIC, an FPGA, another programmable logical device, a discrete gate or transistor logic device, or a discrete hardware component. It may implement or perform the methods, the steps, and logical block diagrams that are disclosed in the embodiments of the present application. The general purpose processor may be a microprocessor, or the processor may be any conventional processor or the like. Steps of the methods disclosed with reference to the embodiments of the present application may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present application may be a volatile memory or a nonvolatile memory, or may include a volatile memory and a nonvolatile memory. The non-volatile memory may be a ROM, a PROM, an EPROM, an EEPROM, or a flash memory. The volatile memory may be a RAM, and is used as an external cache. Many forms of RAMs, for example, an SRAM, a DRAM, an SDRAM, a DDR SDRAM, an ESDRAM, an SLDRAM, and a DR RAM can be used. This is used only as an example, but is not intended for limitative descriptions. It should be noted that the memory of the systems and methods described in this specification is intended to include, but is not limited to, these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sounding reference signal (SRS) configuration method, comprising:
determining, by a base station, a movement speed of a user equipment (UE);
determining, by the base station based on the movement speed of the UE, a UE-specific subframe configuration set of a plurality of UE-specific SRS subframe configuration sets corresponding to a used cell-specific SRS subframe configuration set, and determining a UE-specific SRS subframe configuration parameter in the determined UE-specific subframe configuration set, wherein the UE-specific SRS subframe configuration parameter indicates a subframe for sending an SRS;
sending, by the base station, the UE-specific SRS subframe configuration parameter and identification information of the UE-specific subframe configuration set to the UE;
sending, by the base station, a quantity $L_1$ to the UE, wherein $L_1$ is a maximum quantity of symbols that are in a subframe and that are used to send an SRS, and $L_1$ is a positive integer greater than 1; and
sending, by the base station, indication information to the UE, wherein the indication information indicates a manner for the UE to send $L_2$ SRSs after an aperiodic SRS is triggered, or indicates a manner for the UE to send $L_2$ SRSs in each period, wherein $L_2$ is a positive integer greater than 1 and less than or equal to $L_1$, and wherein the manner comprises sending the $L_2$ SRSs in a plurality of subframes starting from a subframe indicated by the UE-specific SRS subframe configuration parameter;
wherein sending the $L_2$ SRSs further comprises: transmitting Y SRSs in an $n^{th}$ subframe counted from the subframe indicated by the UE-specific SRS subframe configuration parameter, until the $L_2$ SRSs are sent, wherein:

$$Y = \min\left(L_2 - \sum_{m=1}^{n-1} X_m, X_n\right);$$

$X_n =$
$\begin{cases} 1, n \text{ is a special subframe and a length of an } UpPTS \text{ is one symbol} \\ 2, n \text{ is a special subframe and a length of an } UpPTS \text{ is two symbols} \\ \left\lceil \frac{L_2}{N} \right\rceil, n \text{ is a normal subframe} \end{cases}$ ;

and
N is a positive integer greater than or equal to 2 and less than or equal to $L_2$.

2. The method according to claim 1, further comprising:
determining movement speeds of all UEs in a cell; and
determining the used cell-specific SRS subframe configuration set of a plurality of cell-specific SRS subframe configuration sets based on the movement speeds of all the UEs in the cell, and determining a cell-specific SRS subframe configuration parameter in the used cell-specific SRS subframe configuration set, wherein the cell-specific SRS subframe configuration parameter indicates a subframe set for sending an SRS in the cell; and
sending identifiers of the cell-specific SRS subframe configuration parameter and the used cell-specific SRS subframe configuration set.

3. A base station, comprising:
a processor, configured to:
determine a movement speed of a user equipment (UE); and
determine, based on the movement speed of the UE, a UE-specific subframe configuration set of a plurality of UE-specific sounding reference signal (SRS) subframe configuration sets corresponding to a used cell-specific SRS subframe configuration set, and determine a UE-specific SRS subframe configuration parameter in the determined UE-specific subframe configuration set, wherein the UE-specific SRS subframe configuration parameter indicates a subframe for sending an SRS; and a transmitter, configured to send the UE-specific SRS subframe configuration parameter and identification information of the UE-specific SRS subframe configuration set to the UE;

wherein the processor is further configured to:
determine movement speeds of all UEs in a cell; and
determine the used cell-specific SRS subframe configuration set of a plurality of cell-specific SRS subframe configuration sets based on the movement speeds of all the UEs in the cell, and determine a cell-specific SRS subframe configuration parameter in the used cell-specific SRS subframe configuration set, wherein the cell-specific SRS subframe configuration parameter indicates a subframe set for sending an SRS in the cell; and wherein the transmitter is further configured to send identifiers of the cell-specific SRS subframe configuration parameter and the used cell-specific SRS subframe configuration set.

4. The base station according to claim 3, wherein the transmitter is further configured to send a quantity $L_1$ to the UE, wherein $L_1$ is a maximum quantity of symbols that are in a subframe and that are used to send an SRS, and $L_1$ is a positive integer greater than 1.

5. The base station according to claim 4, wherein the transmitter is further configured to send indication information to the UE, wherein the indication information indicates a manner for the UE to send $L_2$ SRSs after an aperiodic SRS is triggered, or indicates a manner for the UE to send $L_2$ SRSs in each period, wherein $L_2$ is a positive integer greater than 1 and less than or equal to $L_1$.

6. The base station according to claim 5, wherein the manner comprises: sending the $L_2$ SRSs in one subframe indicated by the UE-specific SRS subframe configuration parameter.

7. The base station according to claim 5, wherein the manner comprises: sending the $L_2$ SRSs in a plurality of subframes starting from a subframe indicated by the UE-specific SRS subframe configuration parameter.

8. The base station according to claim 7, wherein sending the $L_2$ SRSs further comprises:
transmitting Y SRSs in an $n^{th}$ subframe counted from the subframe indicated by the UE-specific SRS subframe configuration parameter, until the $L_2$ SRSs are sent, wherein:

$$Y = \min\left(L_2 - \sum_{m=1}^{n-1} X_m, X_n\right);$$

$X_n = $
$\begin{cases} 1, n \text{ is a special subframe and a length of an } UpPTS \text{ is one symbol} \\ 2, n \text{ is a special subframe and a length of an } UpPTS \text{ is two symbols} \\ \left\lceil \frac{L_2}{N} \right\rceil, n \text{ is a normal subframe} \end{cases}$;

and

N is a positive integer greater than or equal to 2 and less than or equal to $L_2$.

9. A user equipment (UE), comprising:
a receiver, configured to receive, from a base station, identifiers of a UE-specific sounding reference signal (SRS) subframe configuration parameter and a UE-specific subframe configuration set to which the UE-specific SRS subframe configuration parameter belongs, wherein the UE-specific subframe configuration set is based on a movement speed of the UE; and a processor, configured to determine, based on the identifiers of the UE-specific SRS subframe configuration parameter and the UE-specific subframe configuration set, a subframe for sending an SRS;

wherein the receiver is further configured to receive, from the base station, identifiers of a cell-specific SRS subframe configuration parameter and a cell-specific SRS subframe configuration set to which the cell-specific SRS subframe configuration parameter belongs, wherein the cell-specific SRS subframe configuration set is based on movement speeds of all UEs in a cell;

wherein the processor is further configured to determine, based on the identifiers of the cell-specific SRS subframe configuration parameter and the cell-specific SRS subframe configuration sets, a subframe set for sending an SRS in the cell.

10. The user equipment according to claim 9, wherein the receiver is further configured to receive a quantity $L_1$ from the base station, wherein $L_1$ is a maximum quantity of symbols that are in a subframe and that are used to send an SRS, and $L_1$ is a positive integer greater than 1.

11. The user equipment according to claim 10, wherein the receiver is further configured to receive indication information from the base station, wherein the indication information indicates a manner for the UE to send $L_2$ SRSs after an aperiodic SRS is triggered, or indicates a manner for the UE to send $L_2$ SRSs in each period, wherein $L_2$ is a positive integer greater than 1 and less than or equal to $L_1$.

12. The user equipment according to claim 11, wherein the manner comprises: sending the $L_2$ SRSs in one subframe indicated by the UE-specific SRS subframe configuration parameter.

13. The user equipment according to claim 11, wherein the manner comprises: sending the $L_2$ SRSs in a plurality of subframes starting from a subframe indicated by the UE-specific SRS subframe configuration parameter.

14. The user equipment according to claim 13, wherein sending the $L_2$ SRSs further comprises:
transmitting Y SRSs in an $n^{th}$ subframe counted from the subframe indicated by the UE-specific SRS subframe configuration parameter, until the $L_2$ SRSs are sent, wherein:

$$Y = \min\left(L_2 - \sum_{m=1}^{n-1} X_m, X_n\right);$$

$X_n = $
$\begin{cases} 1, n \text{ is a special subframe and a length of an } UpPTS \text{ is one symbol} \\ 2, n \text{ is a special subframe and a length of an } UpPTS \text{ is two symbols} \\ \left\lceil \frac{L_2}{N} \right\rceil, n \text{ is a normal subframe} \end{cases}$;

and

N is a positive integer greater than or equal to 2 and less than or equal to $L_2$.

* * * * *

UNITED STATES PATENT AND TRADEMARK OFFICE
CERTIFICATE OF CORRECTION

PATENT NO. : 10,819,484 B2  
APPLICATION NO. : 16/180935  
DATED : October 27, 2020  
INVENTOR(S) : Huang et al.

Page 1 of 1

It is certified that error appears in the above-identified patent and that said Letters Patent is hereby corrected as shown below:

On the Title Page

Item [57], Lines 1-4 delete:
"Embodiments of the present application disclose a sounding reference signal configuration method and an apparatus. The method includes: determining, by a base station, a movement speed of user equipment UE;"
And insert:
-- A sounding reference signal configuration method includes: determining, by a base station, a movement speed of user equipment (UE); --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*